(12) United States Patent
Chavan et al.

(10) Patent No.: US 10,058,741 B1
(45) Date of Patent: *Aug. 28, 2018

(54) CARBON NANOTUBES REINFORCED DUAL CORE A GOLF BALL

(71) Applicant: Callaway Golf Company, Carlsbad, CA (US)

(72) Inventors: Vijay Chavan, Vista, CA (US); David Bartels, Carlsbad, CA (US); Armando Becerra, Vista, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,736

(22) Filed: Jul. 21, 2017

Related U.S. Application Data

(60) Provisional application No. 62/367,521, filed on Jul. 27, 2016, provisional application No. 62/371,067, filed on Aug. 4, 2016.

(51) Int. Cl.
| | |
|---|---|
| *C08K 5/098* | (2006.01) |
| *C08L 23/08* | (2006.01) |
| *A63B 37/00* | (2006.01) |
| *C08K 5/00* | (2006.01) |

(52) U.S. Cl.
CPC ...... *A63B 37/0051* (2013.01); *A63B 37/0031* (2013.01); *A63B 37/0033* (2013.01); *A63B 37/0039* (2013.01); *A63B 37/0041* (2013.01); *A63B 37/0043* (2013.01); *A63B 37/0045* (2013.01); *A63B 37/0046* (2013.01); *A63B 37/0054* (2013.01); *A63B 37/0061* (2013.01); *A63B 37/0064* (2013.01); *A63B 37/0065* (2013.01); *A63B 37/0076* (2013.01); *A63B 37/0092* (2013.01); *C08K 5/0025* (2013.01); *C08K 5/098* (2013.01); *C08L 23/0876* (2013.01)

(58) Field of Classification Search
CPC ... C08K 5/098; C08K 5/0025; C08L 23/0876; A63B 37/0092; A63B 37/0076; A63B 37/0045; A63B 37/0043; A63B 37/0051
See application file for complete search history.

(56) References Cited

U.S. PATENT DOCUMENTS

| | | | | |
|---|---|---|---|---|
| 8,974,318 | B1 * | 3/2015 | Ogg | A63B 37/0076 473/376 |
| 9,050,502 | B1 * | 6/2015 | Bartels | A63B 37/0076 |
| 9,789,366 | B1 * | 10/2017 | Chavan | A63B 37/0033 |
| 9,827,466 | B2 * | 11/2017 | DuFaux | A63B 37/0076 |
| 2003/0130061 | A1 * | 7/2003 | Rajagopalan | A63B 37/08 473/354 |
| 2005/0020385 | A1 * | 1/2005 | Onoda | A63B 37/0003 473/371 |

(Continued)

FOREIGN PATENT DOCUMENTS

WO    WO2015/179645    * 11/2015    ......... A63B 37/0076

*Primary Examiner* — John E Simms, Jr.
(74) *Attorney, Agent, or Firm* — Michael A. Catania; Sonia Lari; Rebecca Hanovice

(57) ABSTRACT

A golf ball with a center core comprising polybutadiene and a carbon nanotube material in an amount ranging from 0.4 to 2.5 weight percent of the center core is disclosed herein. Alternatively, the golf ball has a mantle layer with a blend of ionomer materials and a carbon nanotube material in an amount ranging from 0.2 to 2.5 weight percent of the mantle layer.

2 Claims, 16 Drawing Sheets

(56) References Cited

U.S. PATENT DOCUMENTS

| | | | |
|---|---|---|---|
| 2005/0215718 A1* | 9/2005 | Rajagopalan | A63B 37/08 525/221 |
| 2009/0111609 A1* | 4/2009 | Watanabe | A63B 37/0004 473/373 |
| 2012/0100932 A1* | 4/2012 | Watanabe | A63B 37/0031 473/373 |
| 2012/0157233 A1* | 6/2012 | Watanabe | A63B 37/0031 473/373 |
| 2012/0202620 A1* | 8/2012 | Ogg | A63B 37/0003 473/373 |
| 2015/0038266 A1* | 2/2015 | Watanabe | A63B 37/0058 473/373 |
| 2015/0314169 A1* | 11/2015 | Sullivan | A63B 37/0031 473/376 |
| 2016/0151677 A1* | 6/2016 | Watanabe | A63B 37/0076 473/367 |
| 2016/0279482 A1* | 9/2016 | DuFaux | A63B 37/0051 |

* cited by examiner

US 10,058,741 B1

CARBON NANOTUBES REINFORCED DUAL CORE A GOLF BALL

CROSS REFERENCES TO RELATED APPLICATIONS

The Present Application claims priority to U.S. Provisional Patent Application No. 62/367,521, filed on Jul. 27, 2016, and U.S. Provisional Patent Application No. 62/371,067, filed on Aug. 4, 2016, both of which are hereby incorporated by reference in their entirety.

STATEMENT REGARDING FEDERALLY SPONSORED RESEARCH OR DEVELOPMENT

Not Applicable

BACKGROUND OF THE INVENTION

Field of the Invention

The present invention generally relates to the use of carbon nanotubes in layers of a golf ball.

Description of the Related Art

Since their discovery in early 90s (Iijima 1991) Carbon nanotubes (CNT) have come a long way in the world of composite materials. CNT are known for their excellent mechanical strength, high elastic modulus, very high electrical and thermal conductivity. Length of CNT can vary between few microns to millimeters. Their diameter is typically in the range of few nanometers. Thus, aspect ratio (length to diameter ratio) of CNT can be more than 1000. CNT (tensile strength in GPa; Grobert 2007) are more than 1000 times stronger than typical polymers (tensile strength in MPa). This unusually high strength of CNT coupled with their high aspect ratio can result in composite materials with very high tensile and flexural strength. Various examples of CNT based composites can be found in literature in the past 25 years (Winey 2000; Zhijie 1999; Coleman 1998; Chen 2000; Qian 2000; Barrera 2000). The objective of this invention is to improve durability of golf ball by incorporation of CNT in core and or mantle.

The prior art fails to even recognize this problem.

BRIEF SUMMARY OF THE INVENTION

Carbon nanotubes have been known to improve mechanical properties of composite materials. In the design of a golf ball having a dual core with both layers consisting of a polybutadiene rubber composition, a softer inner core covered by a firmer compression outer core can exhibit poor crack durability when impacted at high speeds. Additionally, a ball having a very soft, low compression single piece polybutadiene core can exhibit poor durability properties also. In this patent, a new method to improve durability of dual core and mantle using carbon nanotubes is described.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
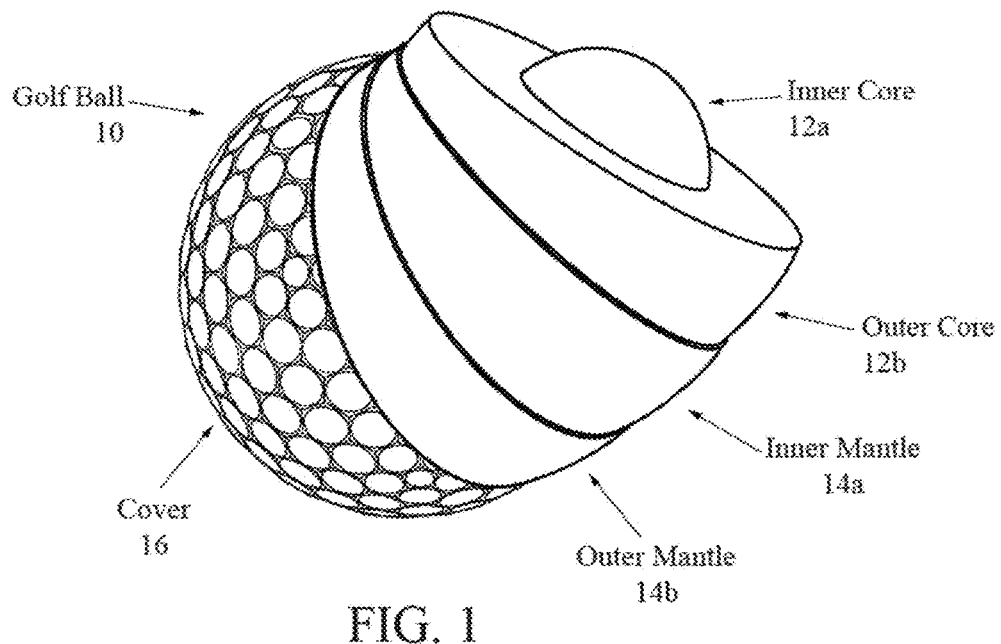
FIG. 1 is an exploded partial cut-away view of a golf ball.
Figure 2:
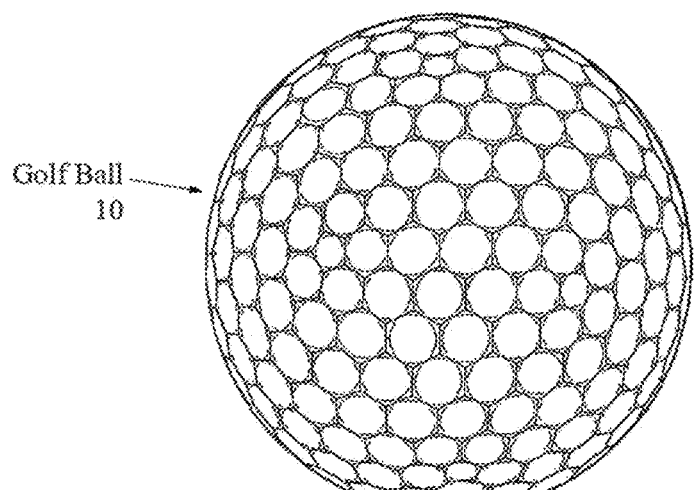
FIG. 2 is top perspective view of a golf ball.
Figure 3:
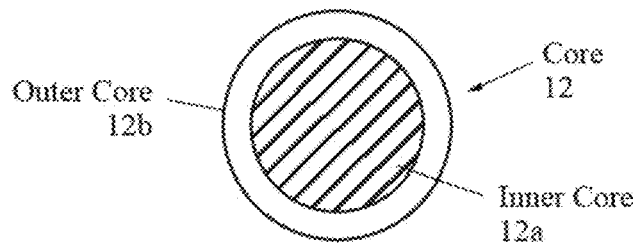
FIG. 3 is a cross-sectional view of a core component of a golf ball.
Figure 4:
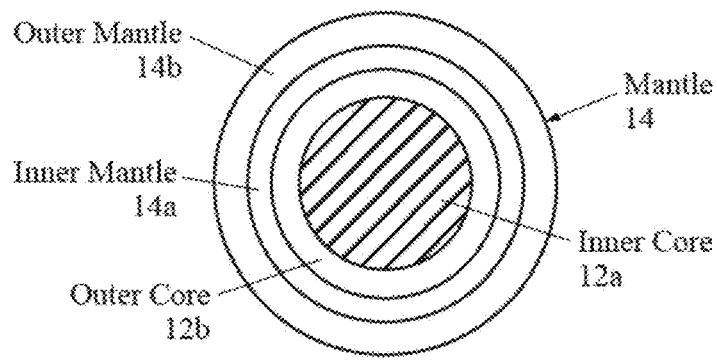
FIG. 4 is a cross-sectional view of a core component and a mantle component of a golf ball.

One objective of the present invention is to improve durability of golf ball core by incorporation of carbon nanotubes (CNT) in either the core or mantle layers to improve the impact strength of the ball. This benefit can be seen in either a ball designed to have a low compression single piece core, or a dual core with an outer core firmer than the inner core. Improved durability of the core or mantle composition by using CNT can result in higher mean time to fail (MTTF) upon repeated impact in a high speed testing device, or with a golf club in normal play.

Another objective of the present invention is to improve aging properties due to the incorporation of CNT in either the core or mantle layer for better retention of compression and COR over time.

Yet another objective of the present invention is to reduce the curing cycle of polybutadiene cores due to the thermal conductivity of CNT, which ranges from 2000-6000 W/mK (Han 2011; Berber 2000) whereas polybutadiene used in the composition of a golf ball core has a thermal conductivity of 0.24 W/mK (Bhushan 2004). This extremely high thermal conductivity of CNT thus can result in more uniform, shorter curing cycles for golf ball cores containing CNT, which in turn increases production output.

Experiment/Results

CNT in cores.

Polybutadiene based cores were made using following materials. Corresponding levels (by % wt) is mentioned next to each material.

Polybutadiene with more than 60% 1,4-cis structure-(40-90%);
Polyisoprene-(1-30%);
Zinc diacrylate-(10-50%);
Zinc oxide-(1-30%);
Zinc stearate-(1-20%);
Peroxide initiator-(0.1-10%);
Zinc pentachlorothiophenol-(0-10%);
Color-(0-10%);
Barium sulfate-(0-20%);
CNT-(0.01-6%)—available from various suppliers such as Bayer Material Science, Future Carbon, Cheap Tubes Inc, NanoAmor Nanocyl, Nanocyl SA, Arkema, NanoTechLabs, Inc.;
CNT masterbatch (a masterbatch of with 5-95% polyisoprene and 1-95% CNT)-(01-50%)—masterbatches or custom masterbatches are available from various suppliers such as Cheap Tubes Inc, Nanocyl SA, Arkema, NanoTechLabs, Inc.

CNT in a Dual Core

In this study CNT was introduced to the outer core in a dual core construction. Dual cores were made by compression molding two outer core halves around an already molded inner core having a diameter of approximately 0.940" and a soft compression of approximately 0.200 inches of deflection under a 200 lb load.

Curing of the outer core was done at temperatures ranging between 150-400 F for times ranging from 1-30 minutes. After molding, the dual cores were spherically ground to approximately 1.554" prior to testing.

Table 1 and 2 give details of recipe of inner and outer cores. Components from these recipes were mixed in an internal mixer. Optionally, additional mixing was done using a two roll mill Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE 1

| Inner core recipe | |
|---|---|
| Components | % wt |
| Polybutadiene rubber | 69.2 |
| Polyisoprene rubber | 0.0 |
| Zinc diacrylate | 14.8 |
| Zinc oxide | 12.2 |
| Zinc stearate | 2.1 |
| Peroxide initiator | 1.0 |
| Zinc pentachlorothiophenol | 0.6 |
| Color | 0.1 |
| Barium sulfate | 0.0 |
| CNT | 0.0 |
| CNT masterbatch | 0.0 |
| Properties | |
| Compression | 0.221 |

TABLE 2

| | Outer recipe of dual core | | | |
|---|---|---|---|---|
| Components | Formula 1 % wt | Formula 2 % wt | Formula 3 % wt | Formula 4 % wt |
| Polybutadiene rubber | 62.6 | 62.3 | 62.1 | 61.6 |
| Polyisoprene rubber | 0.0 | 0.0 | 0.0 | 0.0 |
| Zinc diacrylate | 19.9 | 19.8 | 19.7 | 19.6 |
| Zinc oxide | 6.3 | 6.2 | 6.2 | 6.2 |
| Zinc stearate | 3.8 | 3.7 | 3.7 | 3.7 |
| Peroxide initiator | 0.5 | 0.5 | 0.5 | 0.5 |
| Zinc pentachlorothiophenol | 0.6 | 0.6 | 0.6 | 0.6 |
| Color | 0.0 | 0.0 | 0.0 | 0.0 |
| Barium sulfate | 6.4 | 6.4 | 6.4 | 6.3 |
| CNT | 0.0 | 0.4 | 0.8 | 1.6 |
| CNT masterbatch | 0.0 | 0.0 | 0.0 | 0.0 |
| Properties of outer core | | | | |
| Compression | 72.1 | 77.2 | 79.8 | 81.2 |
| COR (coefficient of restitution) | 0.800 | 0.798 | 0.793 | 0.784 |
| Properties of dual core built from inner and outer core | | | | |
| Compression | 45.1 | 52.9 | 56.0 | 56.3 |
| COR (coefficient of restitution @ 125 fps) | 0.793 | 0.794 | 0.792 | 0.786 |
| Durability score or mean time to fail MTTF (number of shots after which ball starts to crack/fail) | 26.0 | 48.0 | 87.0 | >100 |

Compression is measured by applying a 200 pound load to the core and measuring its deflection, in inches. Compression=180−(deflection*1000).

Durability Testing of Dual Cores.

Cores were shot at 175 fps in a pneumatic testing machine (PTM).

Figure 20:
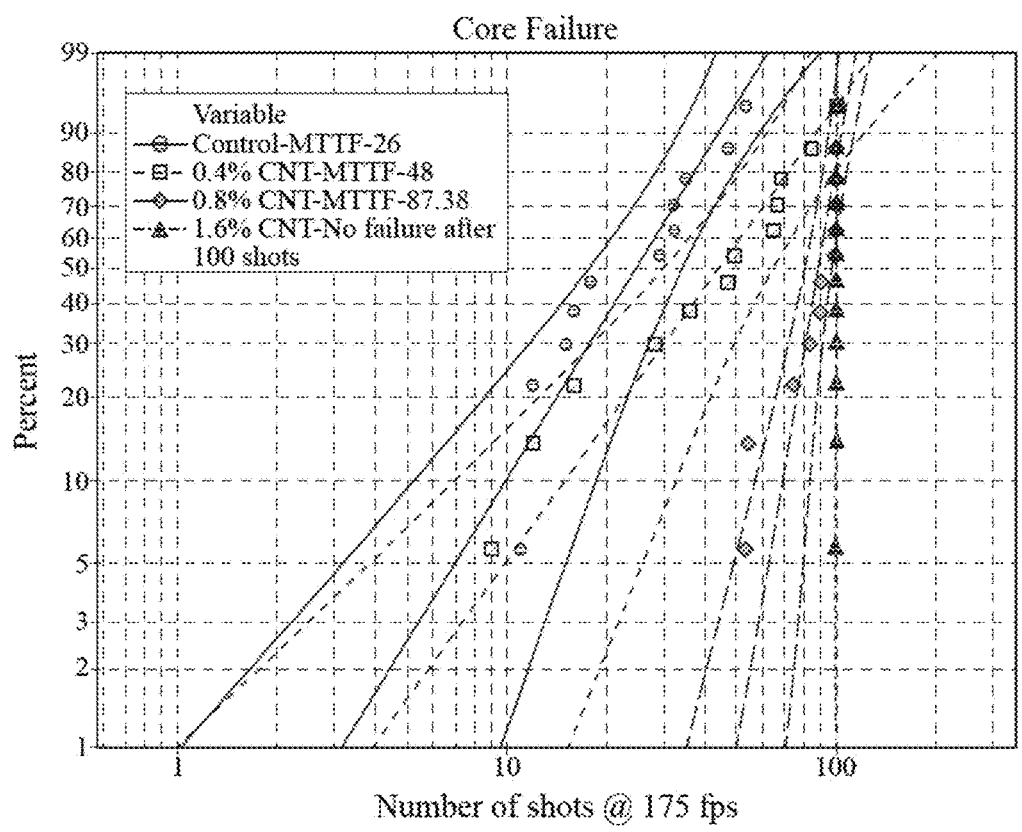
FIG. 20 is a graph of durability testing of dual cores using PTM at 175 fps.

For each formula mentioned in Table 2, 12 cores were tested. Number of shots after which each core cracked was recorded for each core, and the cracked core was removed from the remainder of the test. The data was reported using a Weibull plot, and the mean time to failure was reported as shown in Table 2. As seen in FIG. 20, CNT modified cores endured more shots before failure compared to cores with no CNT.

It is reasonable to assume that the durability of a golf ball having a dual core of this design will also experience a dramatic increase in crack durability based on this improvement to the dual core.

It's reasonable to assume that the addition of CNT in the inner core could provide a durability enhancement to the overall golf ball, but this study only focused on the outer core.

CNT in a soft single piece core.

In this study we added CNT to a polybutadiene recipe in a large, soft core. The solid core was cured within a temperature range of 150-400 F for times ranging from 1-30 minutes. After molding, the solid cores were spherically ground to approximately 1.590" prior to testing.

Table 3 gives details of recipe of solid core. Components from these recipes were mixed in an internal mixer. Optionally, additional mixing was done using a two roll mill.

TABLE 3

Recipe of a solid soft core

| Components | Formula 1 % wt | Formula 2 % wt | Formula 3 % wt | Formula 4 % wt |
| --- | --- | --- | --- | --- |
| Polybutadiene rubber | 66.7 | 66.4 | 66.2 | 65.7 |
| Polyisoprene rubber | 0.0 | 0.0 | 0.0 | 0.0 |
| Zinc diacrylate | 13.5 | 13.4 | 13.4 | 13.3 |
| Zinc oxide | 6.7 | 6.6 | 6.6 | 6.6 |
| Zinc stearate | 2.0 | 2.0 | 2.0 | 2.0 |
| Peroxide initiator | 1.0 | 1.0 | 1.0 | 1.0 |
| Zinc pentachlorothiophenol | 0.6 | 0.6 | 0.6 | 0.6 |
| Color | 0.1 | 0.1 | 0.1 | 0.1 |
| Barium sulfate | 9.4 | 9.4 | 9.4 | 9.3 |
| CNT | 0.0 | 0.4 | 0.8 | 1.6 |
| CNT masterbatch | 0.0 | 0.0 | 0.0 | 0.0 |
| Properties of core | | | | |
| Compression | 1.1 | 9.7 | 12.6 | 16.7 |
| COR (coefficient of restitution @ 125 fps) | 0.777 | 0.774 | 0.768 | 0.759 |
| Durability score or mean time to fail MTTF (number of shots after which ball starts to crack/fail) | 25 | 27 | 42 | 62 |

Durability Testing of Solid Cores

Cores were shot at 150 fps in a pneumatic testing machine (PTM).

Figure 21:
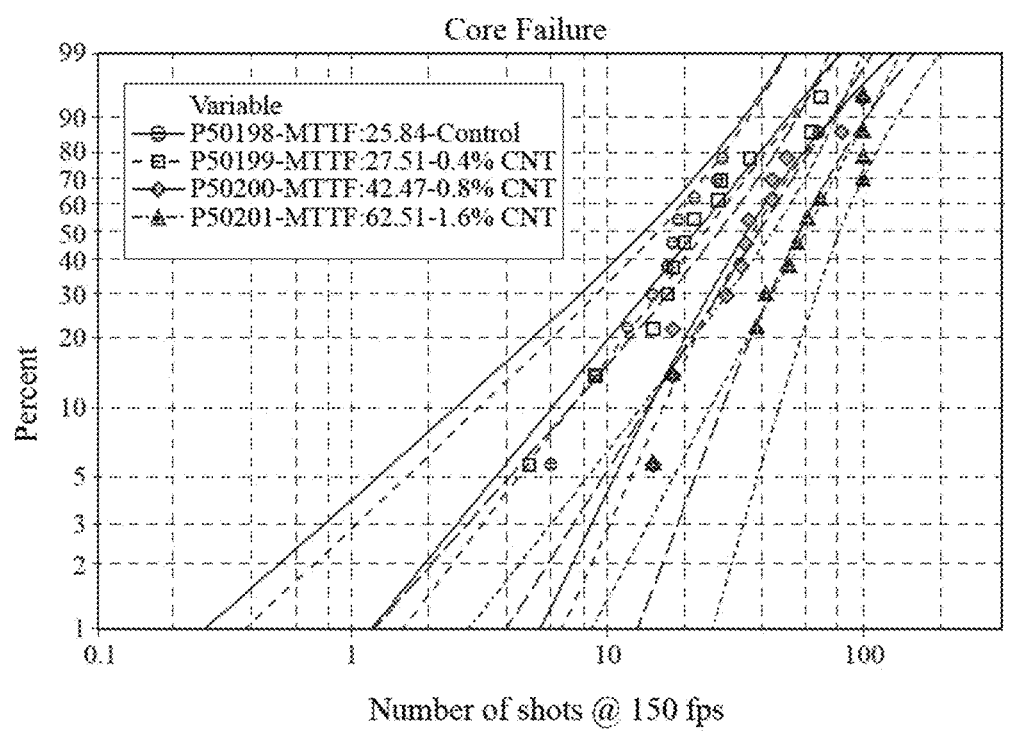
FIG. 21 is a graph of durability testing of solid cores using PTM at 150 fps.

For each formula mentioned in Table 3, 12 cores were tested. Number of shots after which each core cracked was recorded for each core, and the cracked core was removed from the remainder of the test. The data was reported using a Weibull plot, and the mean time to failure was reported as shown in Table 3. As seen in FIG. 21, CNT modified cores endured more shots before failure compared to cores with no CNT. It is reasonable to assume that the durability of a golf ball having a soft single piece core of this design will also experience a dramatic increase in crack durability based on this improvement to the core.

CNT in Surlyn Mantle

Surlyn polymers were extruded along with CNT in appropriate amounts as shown in Table 4. These extruded pellets were then used for injection molding mantle on dual cores. In this study, both layers of the dual core did not contain CNT in order to assess the improvement isolated to the mantle. The dual cores were all made at the same time and were spherically ground to 1.542 inches before injection molding the 5 different mantle layers compositions. The mantles were molded and then spherically ground to 1.614" to produce a consistent thickness of roughly 0.036 inch.

Durability Testing of Mantles

Figure 22:
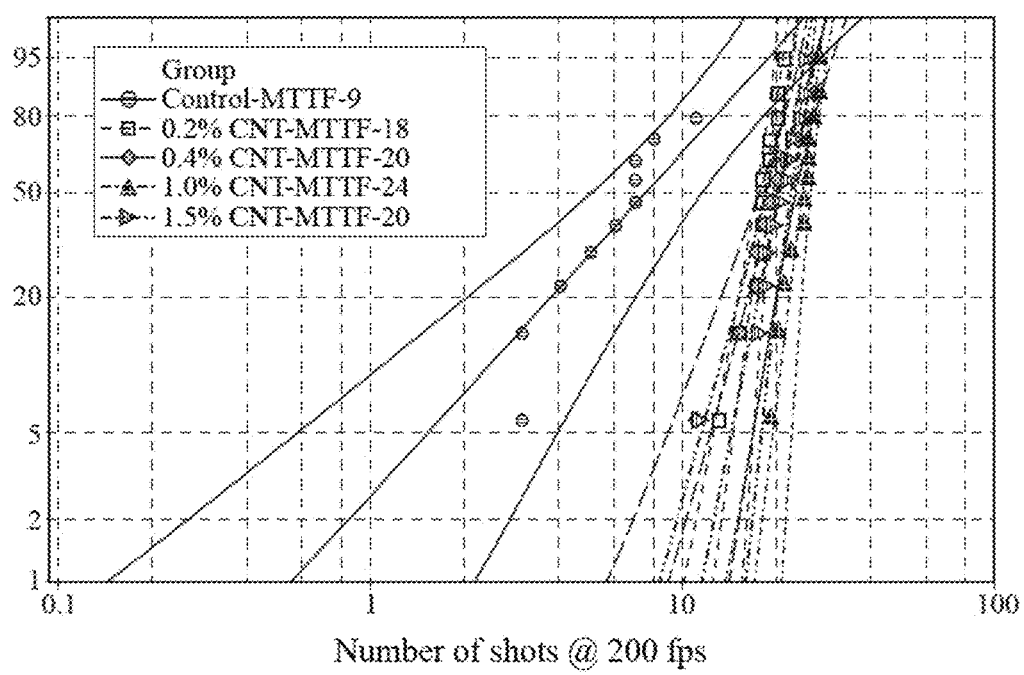
FIG. 22 is a graph of durability testing of mantle using PTM.

Mantles were then shot at 200 fps in a pneumatic testing machine (PTM). For each formula mentioned in Table 4, 12 mantles were tested. Number of shots after which each mantle cracked was recorded and the cracked mantle was removed from the remainder of the test. The data was reported using a Weibull plot, and the mean time to failure was reported as shown in Table 4 and plotted in FIG. 22. Results show that the durability of CNT based mantles almost doubled with incorporation of CNT and reached a maximum at 1% CNT loading. It's also noted that the CNT had a negligible effect on the COR of the mantle.

TABLE 4

Mantle recipe

| Description | Control mantle | Formula 1 | Formula 2 | Formula 3 | Formula 4 |
| --- | --- | --- | --- | --- | --- |
| Surlyn 1 (%) | 50 | 49.9 | 49.8 | 49.5 | 49.25 |
| Surlyn 2 (%) | 50 | 49.9 | 49.8 | 49.5 | 49.25 |
| CNT (%) | 0 | 0.2 | 0.4 | 1 | 1.5 |
| Properties of mantles | | | | | |
| Compression | 59.7 | 60.2 | 59.9 | 59.8 | 59.4 |
| COR (coefficient of restitution @ 125 fps) | 0.797 | 0.798 | 0.797 | 0.797 | 0.797 |
| Durability score or mean time to fail MTTF (number of shots after which ball starts to crack/fail) | 9 | 18 | 20 | 24 | 20 |

Compression is measured by applying a 200 pound load to the core and measuring its deflection, in inches. Compression=180−(deflection*1000).

Durability of the dual core with a high compression differential is greatly enhanced by incorporation of CNT in outer core. The CNT reinforcement to the outer core helps resist the high stresses experienced by the core when struck at high club speeds.

Similarly, a soft solid core is prone to worse crack durability, as compared to a higher compression core, when experiencing high impact forces. CNT incorporation into a soft core recipe helps reinforce the strength of the core and enhances durability.

The addition of CNT to the core recipe is very simple and can be dispersed into the polybutadiene mixture during two roll milling process.

Optionally, CNT can be introduced as a masterbatch in polyisoprene, making its dispersion into polybutadiene rubber much easier and dust free.

Dual Core

As our experiment has shown, incorporating CNT into the outer core recipe reinforces the strength of the outer core and provides greater crack durability protection in the design of a dual core golf ball, which is more susceptible to crack durability failures if the outer core is much firmer than the soft inner core.

In general, this is applicable when the inner core is softer than the outer core. More specifically, when the inner core has more than 0.200" deflection under a 200 lb load, and the dual core is 40 compression or greater.

This is particularly crucial if the ball is a 4-piece construction with a single mantle layer with thickness less than 0.050", or more specifically thinner than 0.040", with 0.036" being the target in this study.

Solid Core

Similarly, CNT incorporation can also exhibit enhanced durability in single piece cores made at very low compression. This is especially important when ultra-low compression golf balls are played for numerous holes and hit with high impact forces.

Specifically a soft core greater than 1.550" in a multi-layer construction with extremely thin outer layers that aren't able to provide much reinforcement.

More specifically, in a 2-piece construction when the core is softer than 20 compression and larger than 1.580 inches, with this study using a core of approximately 0 compression and a size of 1.590 inches.

Mantle

Incorporating CNT into the mantle composition is another means by which we can improve the durability of the dual core, multi-layer golf ball, specifically of the 4-piece design since a single mantle layer alone is protecting the core.

The CNT mantle is particularly crucial if the single mantle layer has a thickness less than 0.050", or more specifically thinner than 0.040", with 0.036" being the target in this study.

The CNT incorporation can be dry-blended at the injection molding machine, but also specifically done via extrusion compounding prior to injection molding.

Whichever method is chosen, durability of golf balls can be greatly enhanced by the incorporation of CNT into either the core or mantle layers.

FIGS. 1, 3, 4 and 5 illustrate a five piece golf ball 10 comprising an inner core 12a, an outer core 12b, an inner mantle 14a, an outer mantle 14b, and a cover 16, wherein the cover layer 16 is composed of a thermoplastic polyurethane and has a Shore A hardness less than 90. The inner core 12a comprises polybutadiene mixture comprising 0.4 to 2.5 weight percent of a CNT material.

Figure 5:
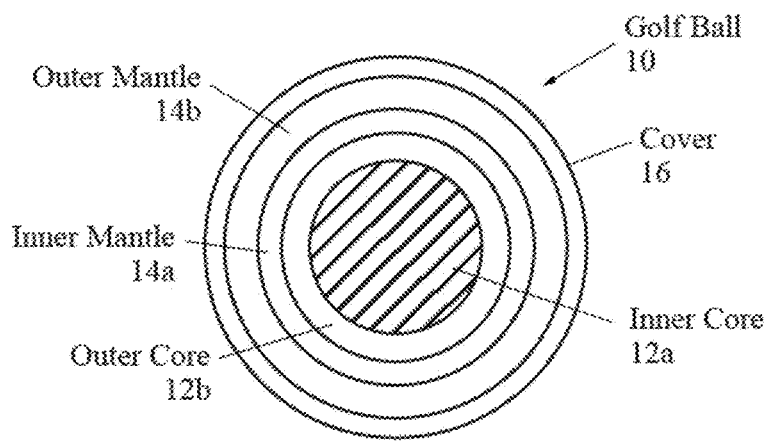
FIG. 5 is a cross-sectional view of an inner core layer, an outer core layer, an inner mantle layer, an outer mantle layer and a cover layer of a golf ball.
Figure 5A:
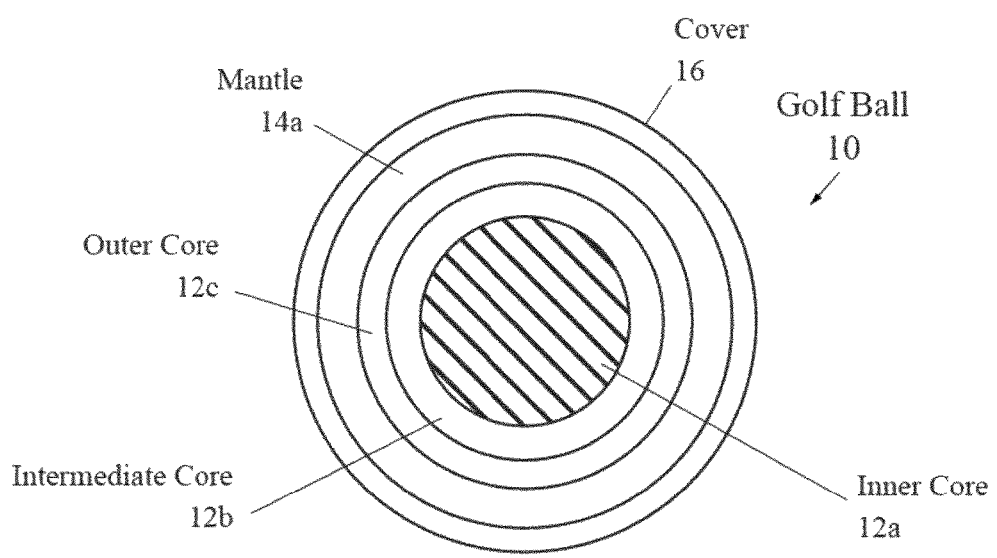
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein the cover layer 16 is composed of a thermoplastic polyurethane. The intermediate core 12b comprises polybutadiene mixture comprising 0.4 to 2.5 weight percent of a CNT material.

Figure 8:
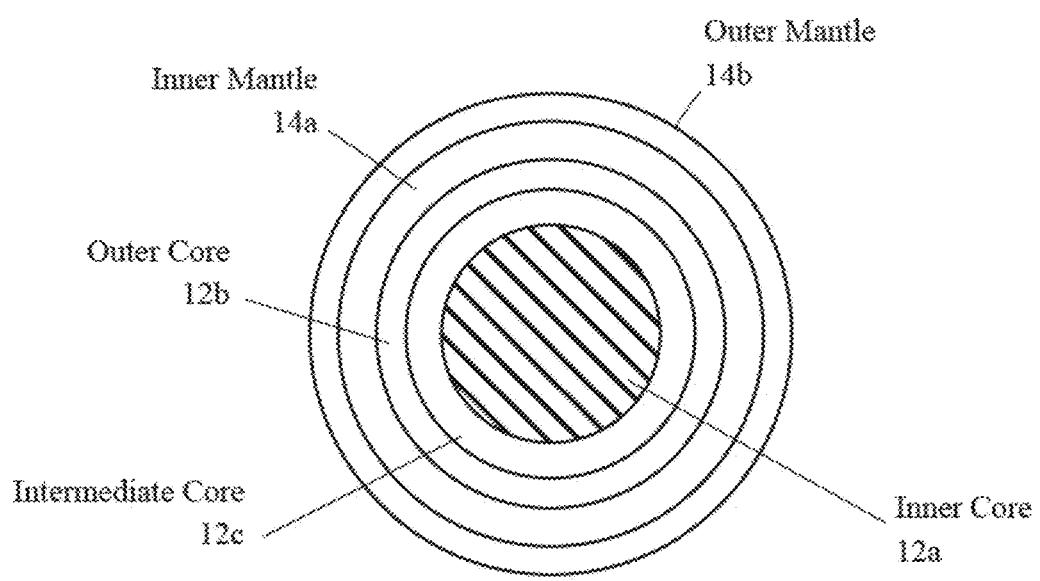
FIG. 8 is a cross-sectional view of a core component and a mantle component of a golf ball.
Figure 9:
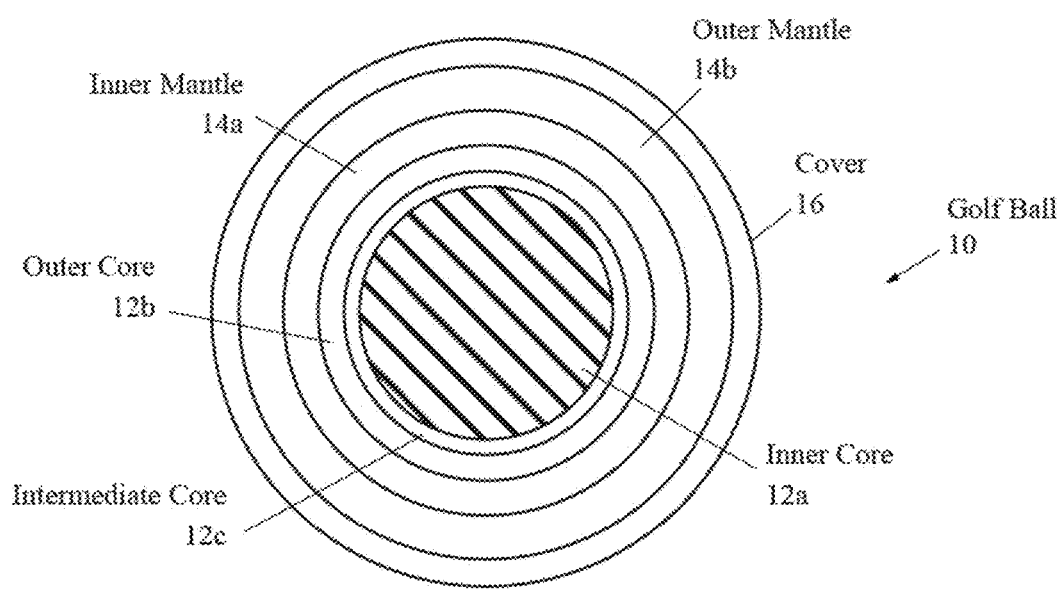
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein the cover layer 16 is composed of a thermoplastic polyurethane. The inner core 12a comprises polybutadiene mixture comprising 0.4 to 2.5 weight percent of a CNT material.

Figure 10:
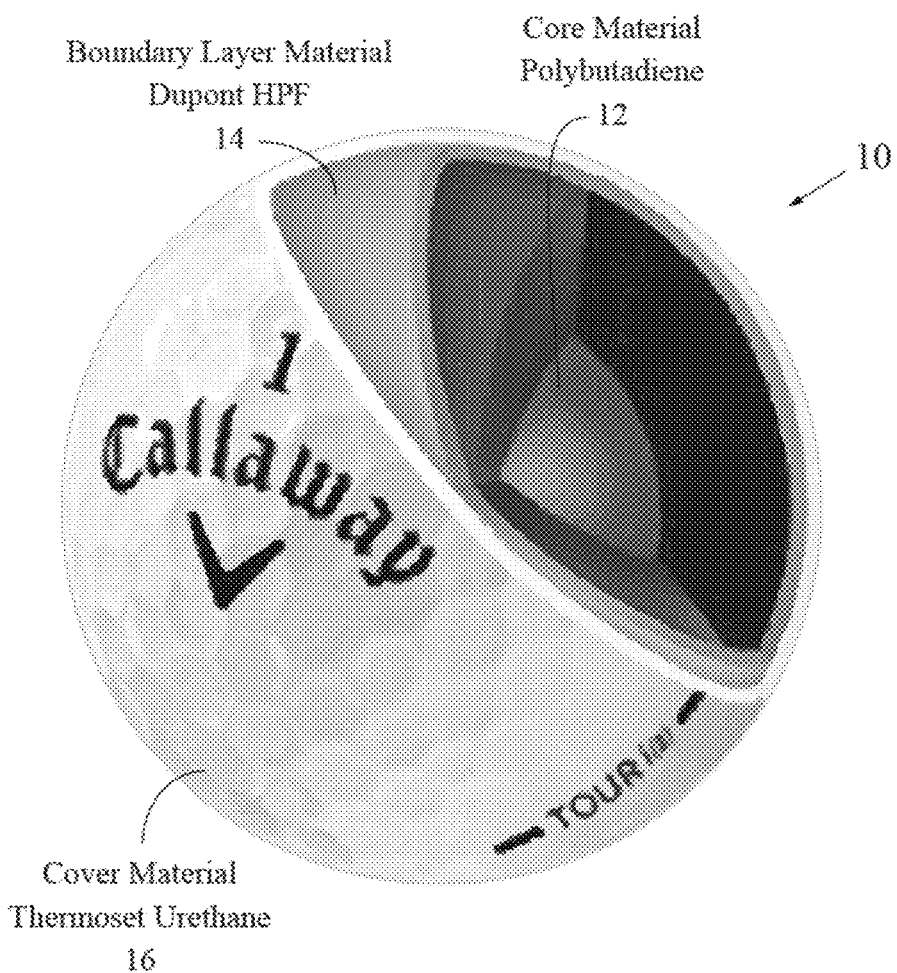
FIG. 10 is an exploded partial cut-away view of a four-piece golf ball.

FIG. 10 illustrates a four piece golf ball comprising a dual core, a boundary layer and a cover. The outer core comprises polybutadiene mixture comprising 0.4 to 2.5 weight percent of a CNT material.

Figure 11:
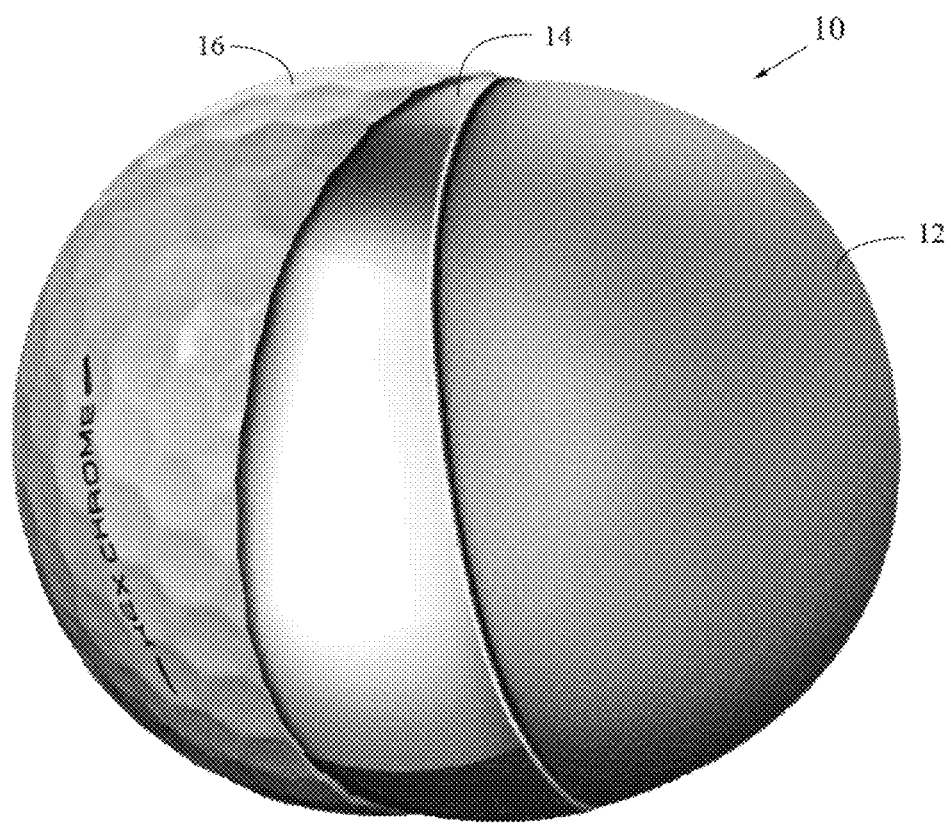
FIG. 11 is an exploded partial cut-away view of a three-piece golf ball.

FIG. 11 illustrates a three piece golf ball comprising a core, a boundary layer and a cover. The core comprises polybutadiene mixture comprising 0.4 to 2.5 weight percent of a CNT material.

Figure 12:
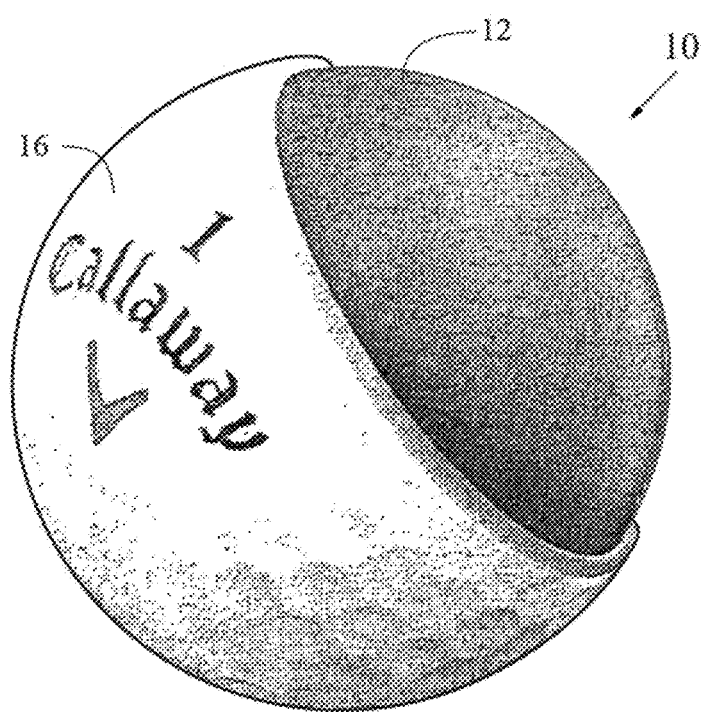
FIG. 12 is an exploded partial cut-away view of a two-piece golf ball.
Figure 13:
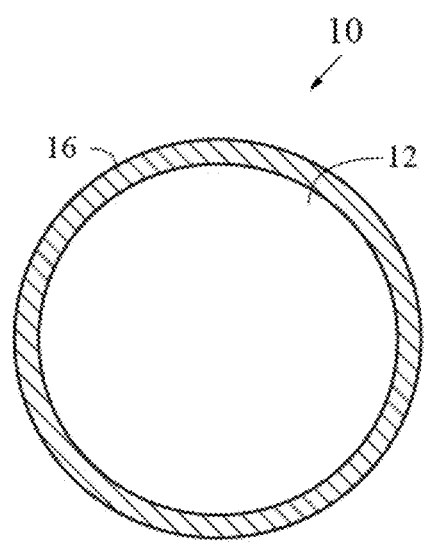
FIG. 13 is a cross-sectional view of a two-piece golf ball.

FIGS. 12 and 13 illustrate a two piece golf ball 20 with a core 25 and a cover 30. The core comprises polybutadiene mixture comprising 0.4 to 2.5 weight percent of a CNT material.

Figure 14:
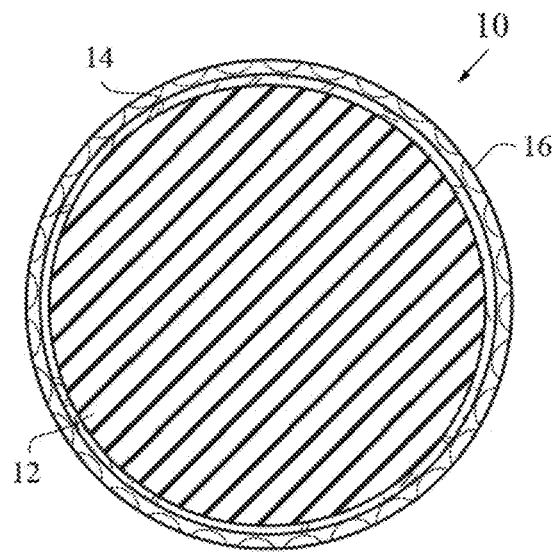
FIG. 14 is a cross-sectional view of a three-piece golf ball.
Figure 15:
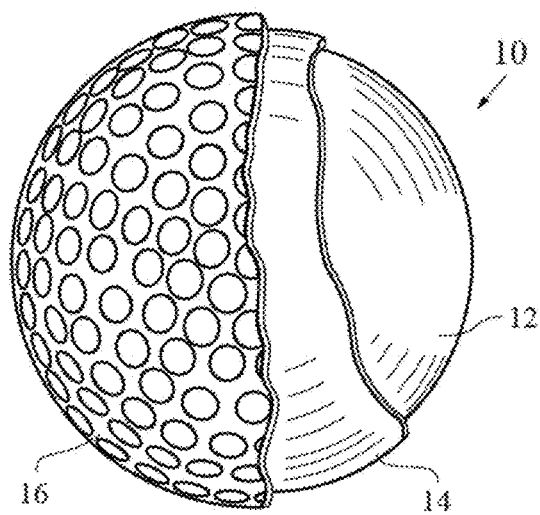
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18, wherein the mantle layer comprises 0.4 to 2.5 weight percent of a CNT material, and at least one ionomer material.

Figure 16:
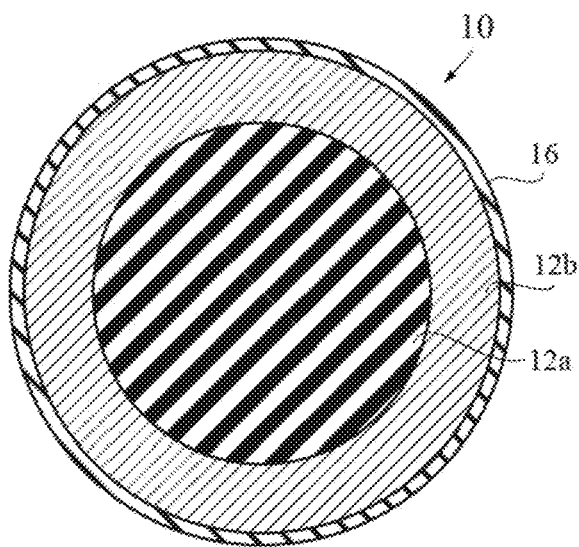
FIG. 16 is a cross-sectional view of a three-piece golf ball with a dual core and a cover.

FIG. 16 illustrates a dual core three piece golf ball 35 comprising an inner core 30, and outer core 32 and a cover 34, wherein the mantle layer comprises 0.4 to 2.5 weight percent of a CNT material, and at least one ionomer material.

Figure 17:
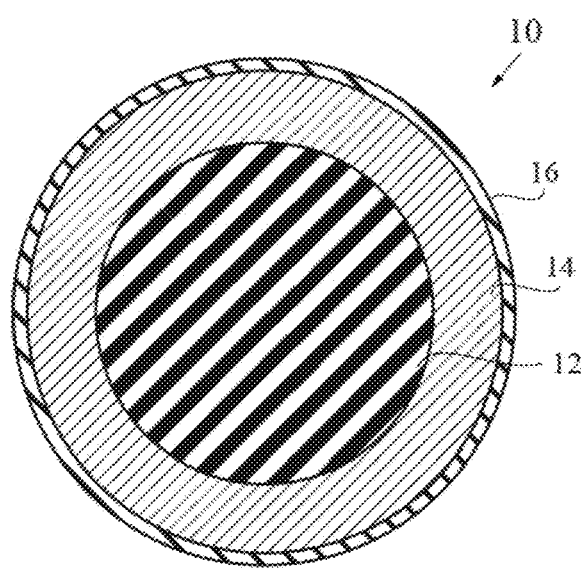
FIG. 17 is a cross-sectional view of a three-piece golf ball with a core, mantle and cover.

FIG. 17 illustrates a three piece golf ball 45 comprising a core 40, a mantle layer 42 and a cover 44, wherein the mantle layer comprises 0.4 to 2.5 weight percent of a CNT material, and at least one ionomer material.

Figure 18:
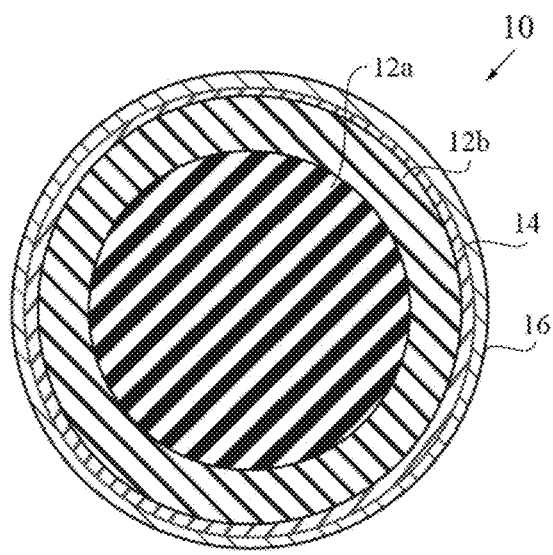
FIG. 18 is a cross-sectional view of a four-piece golf ball with a dual core, mantle layer and a cover.

FIG. 18 illustrates a dual core four piece golf ball 55 comprising an inner core 50, an outer core 52, a mantle layer 54 and a cover 56, wherein the mantle layer comprises 0.4 to 2.5 weight percent of a CNT material, and at least one ionomer material.

Figure 19:
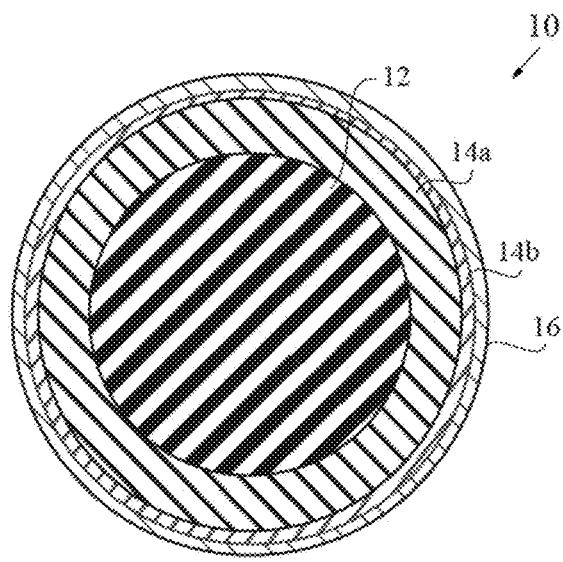
FIG. 19 is a cross-sectional view of a four-piece golf ball with a core, dual mantle layers and a cover.

FIG. 19 illustrates a four piece golf ball 65 comprising a core 60, an inner mantle 62, an outer mantle 64 and a cover 66, wherein the inner mantle layer comprises 0.4 to 2.5 weight percent of a CNT material, and at least one ionomer material.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
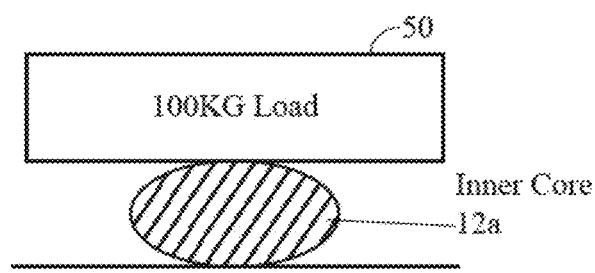
FIG. 6 is a cross-sectional view of an inner core layer under a 100 kilogram load.
Figure 7:
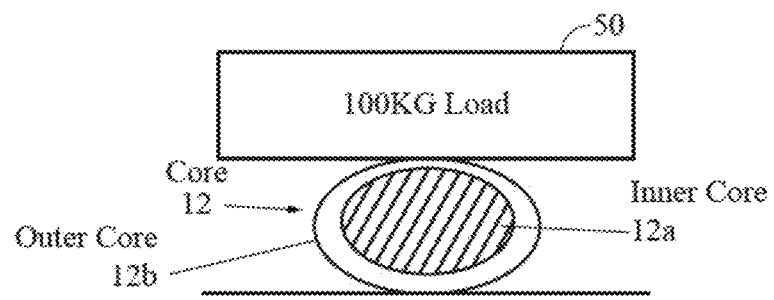
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a TPEE material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A golf ball comprising:
 a center core comprising polybutadiene and a carbon nanotube material in an amount ranging from 0.4 to 2.5 weight percent of the center core;
 an outer core disposed over the center core;
 an inner mantle layer disposed over the outer core, the inner mantle layer having a thickness ranging from 0.025 inch to 0.040 inch, the inner mantle layer composed of an ionomer material, the inner mantle layer material having a plaque Shore D hardness ranging from 65 to 71;

an outer mantle layer disposed over the inner mantle layer, the outer mantle layer having a thickness ranging from 0.070 inch to 0.090 inch; and a cover layer disposed over the outer mantle layer, the cover layer has a thickness ranging from 0.025 inch to 0.040 inch;

wherein the cover layer has a lower Shore D hardness than the outer mantle layer, the outer mantle layer has a higher Shore D hardness than the inner mantle layer, the outer core has a higher Shore D hardness than the inner mantle layer and the center core.

2. The golf ball according to claim 1 wherein the carbon nanotube material ranges from 0.4 to 1.6 weight percent of the center core.

* * * * *